United States Patent
Markie

(10) Patent No.: US 12,522,052 B2
(45) Date of Patent: Jan. 13, 2026

(54) PRESSURE RELIEF VALVE WITH INSTALLATION INDICATOR

(71) Applicant: Illinois Tool Works Inc., Glenview, IL (US)

(72) Inventor: Michael R. Markie, Roseville, MI (US)

(73) Assignee: Illinois Tool Works Inc., Glenview, IL (US)

( * ) Notice: Subject to any disclaimer, the term of this patent is extended or adjusted under 35 U.S.C. 154(b) by 566 days.

(21) Appl. No.: 17/902,189

(22) Filed: Sep. 2, 2022

(65) Prior Publication Data

US 2023/0136671 A1     May 4, 2023

Related U.S. Application Data

(60) Provisional application No. 63/272,830, filed on Oct. 28, 2021.

(51) Int. Cl.
| | |
|---|---|
| *B60H 1/24* | (2006.01) |
| *B60H 1/00* | (2006.01) |
| *F16K 15/03* | (2006.01) |
| *G05B 19/12* | (2006.01) |

(52) U.S. Cl.
CPC ......... *B60H 1/249* (2013.01); *B60H 1/00007* (2013.01); *F16K 15/03* (2013.01); *G05B 19/128* (2013.01); *B60H 2001/00078* (2013.01)

(58) Field of Classification Search
CPC .... B60H 1/249; B29C 66/9672; G05B 19/128
See application file for complete search history.

(56) References Cited

U.S. PATENT DOCUMENTS

| | | | |
|---|---|---|---|
| 5,194,038 A | 3/1993 | Klomhaus | |
| 5,263,895 A | 11/1993 | Kraus | |
| 5,601,117 A | 2/1997 | Lewis | |
| 5,904,618 A | 5/1999 | Lewis | |
| 6,132,308 A * | 10/2000 | Dietz | B60R 21/164 |
| | | | 454/162 |
| 6,837,784 B2 | 1/2005 | Omiya | |
| 7,044,164 B2 | 5/2006 | Carlson | |
| 7,137,880 B2 | 11/2006 | Omiya | |
| 8,328,609 B2 | 12/2012 | Schneider | |
| 8,419,513 B2 | 4/2013 | Weber | |
| 8,955,542 B2 | 2/2015 | Kiezulas | |
| 8,986,086 B2 * | 3/2015 | Carlson | B60H 1/249 |
| | | | 292/87 |
| 10,391,838 B2 | 8/2019 | Schwarzkopf | |
| 2009/0068940 A1 | 3/2009 | Bloemeling | |
| 2009/0075580 A1 | 3/2009 | Mootz | |

(Continued)

*Primary Examiner* — Steven S Anderson, II
(74) *Attorney, Agent, or Firm* — McAndrews, Held & Malloy, Ltd.

(57) ABSTRACT

A pressure vent valve for ventilation of the interior of a motor vehicle, with a frame with at least one sealing surface and with at least one flexible valve flap mounted on the frame. In an idle position, the valve flap assembly abuts the sealing surface to prevent airflow through the pressure vent valve. When a sufficient pressure occurs, the valve flap assembly assumes an open position lifted from the sealing surface to allow airflow through the pressure vent valve. The pressure vent valve further includes an installation indicator formed in or on the frame to ensure alignment during installation.

20 Claims, 5 Drawing Sheets

(56) References Cited

U.S. PATENT DOCUMENTS

| | | |
|---|---|---|
| 2010/0120346 A1 | 5/2010 | Jansen |
| 2018/0283446 A1* | 10/2018 | Todd ........................ E05D 9/005 |
| 2020/0406206 A1* | 12/2020 | McLellan ............... B01F 35/92 |
| 2021/0056306 A1* | 2/2021 | Hu ........................ G06V 40/193 |
| 2021/0064948 A1* | 3/2021 | Geisen ............. G06K 19/06159 |

* cited by examiner

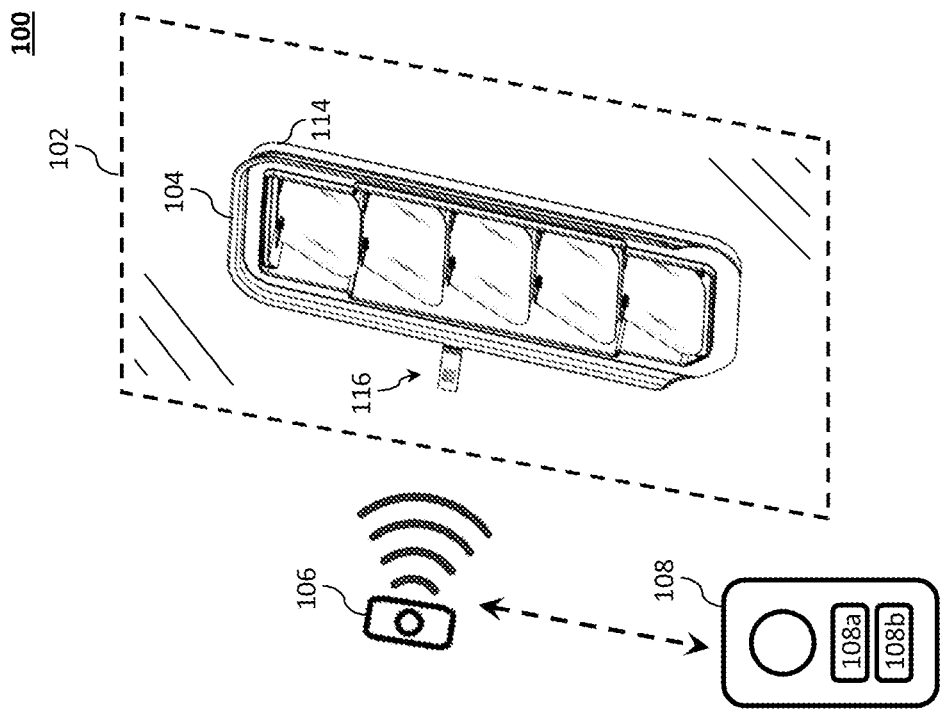
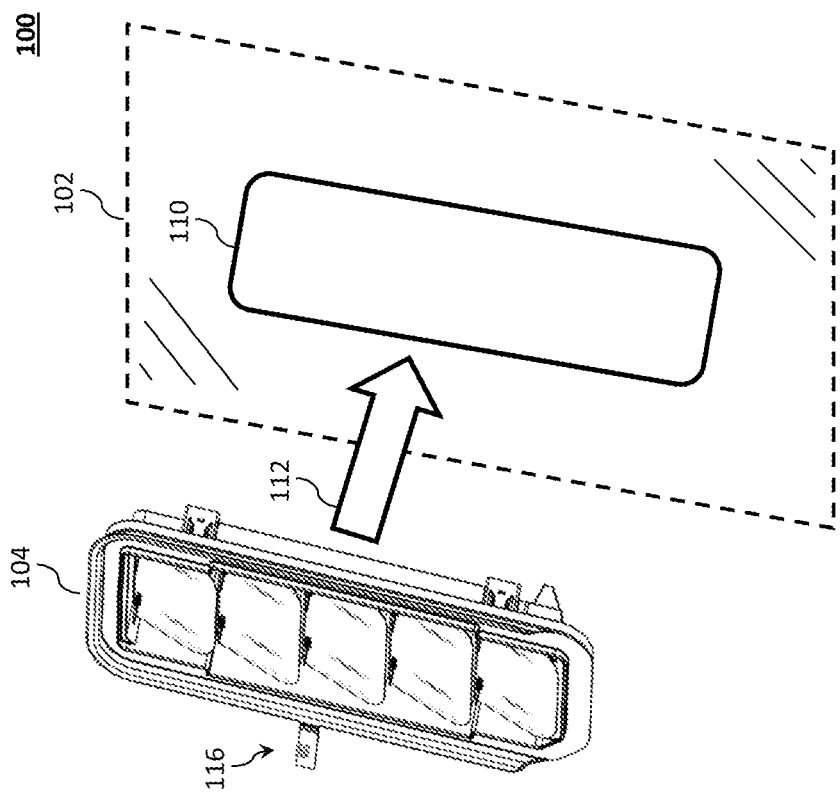
FIG. 1b
FIG. 1a

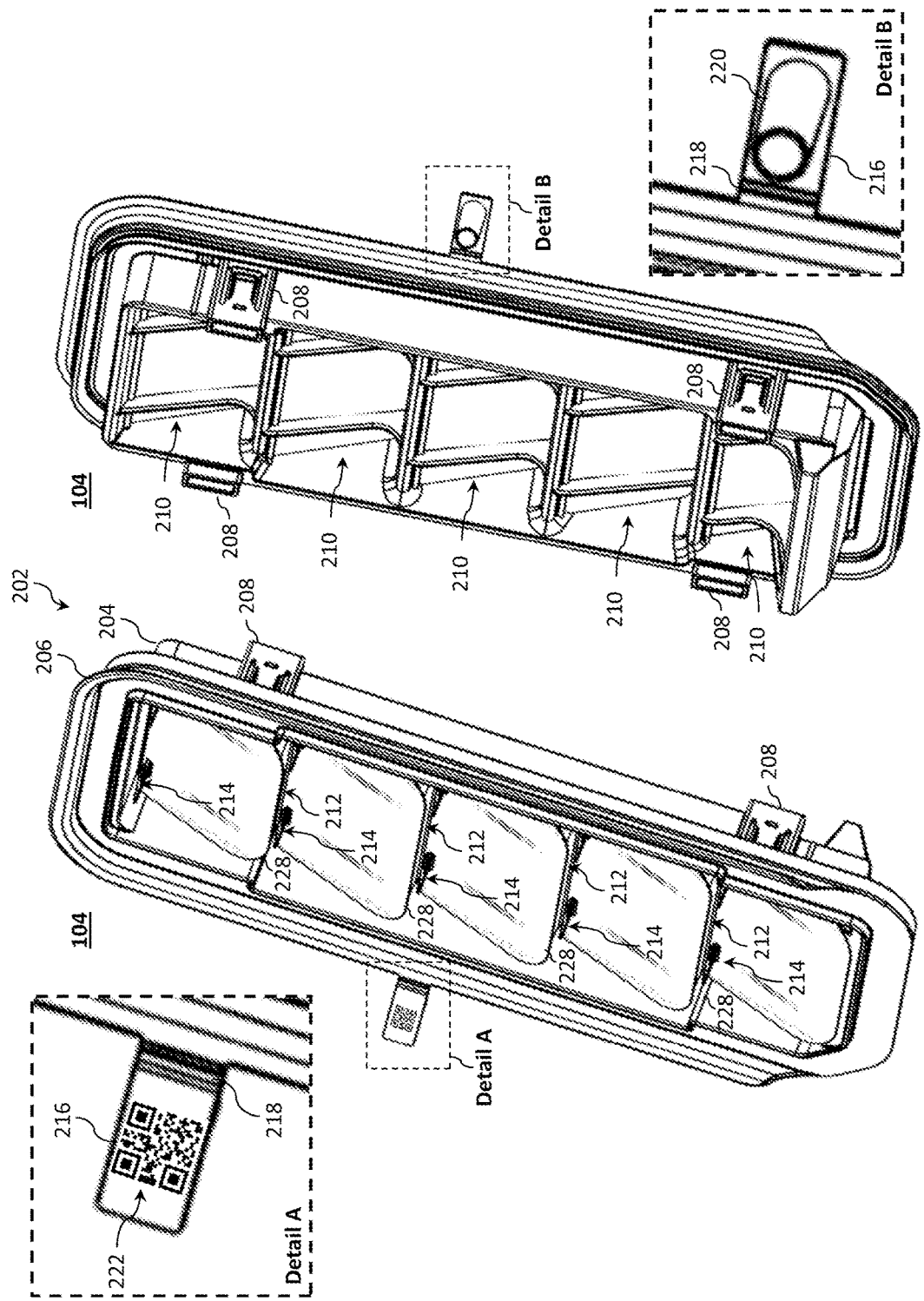

PRESSURE RELIEF VALVE WITH INSTALLATION INDICATOR

CROSS-REFERENCE

The present application claims the benefit under 35 U.S.C. § 119(e) of U.S. Provisional Patent Application Ser. No. 63/272,830, which was filed on Oct. 28, 2021 and is entitled "PRV Barcode Installation Indicator." The contents of which are hereby incorporated by reference.

BACKGROUND

The disclosure relates to a return air blocking device for ventilation of the interior of a vehicle, such as a motor vehicle. Such return air blocking devices are fitted in apertures in the body of a vehicle. In operation, if a positive pressure predominates in the interior of the vehicle relative to the environment of the vehicle, the valve flaps of the return air blocking device open to allow air to flow out of the vehicle interior and reduce the positive pressure. In the opposite flow direction, the valve flaps block the openings. Example return air blocking devices to ventilate the interior of vehicles are described in commonly owned U.S. Pat. No. 8,328,609 to Daniel Schneider and U.S. Pat. No. 10,391,838 to Nikolaus Schwarzkopf and Marco Spanier.

When a return air blocking device is installed incorrectly such that the return air blocking device is not fully inserted into the aperture within the vehicle, the seal between the return air blocking device and the vehicle will not compress sufficiently to perform the function of sealing. As a result, the interior of the vehicle could be damaged by inward dust and water leakage from the exterior environment. Therefore, it would be desirable to provide an installation indicator to enhance proper installation of the return air blocking device during assembly with a vehicle.

SUMMARY

The present disclosure relates generally to a return air blocking device with an installation indicator to enhance proper installation of the return air blocking device, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1a and 1b illustrate, respectively, isometric views of an example return valve installation system before and after assembly in accordance with an aspect of this disclosure.

FIGS. 2a and 2b illustrate, respectively, front perspective and rear perspective, views of the pressure vent valve.

DESCRIPTION

Figure 2C:
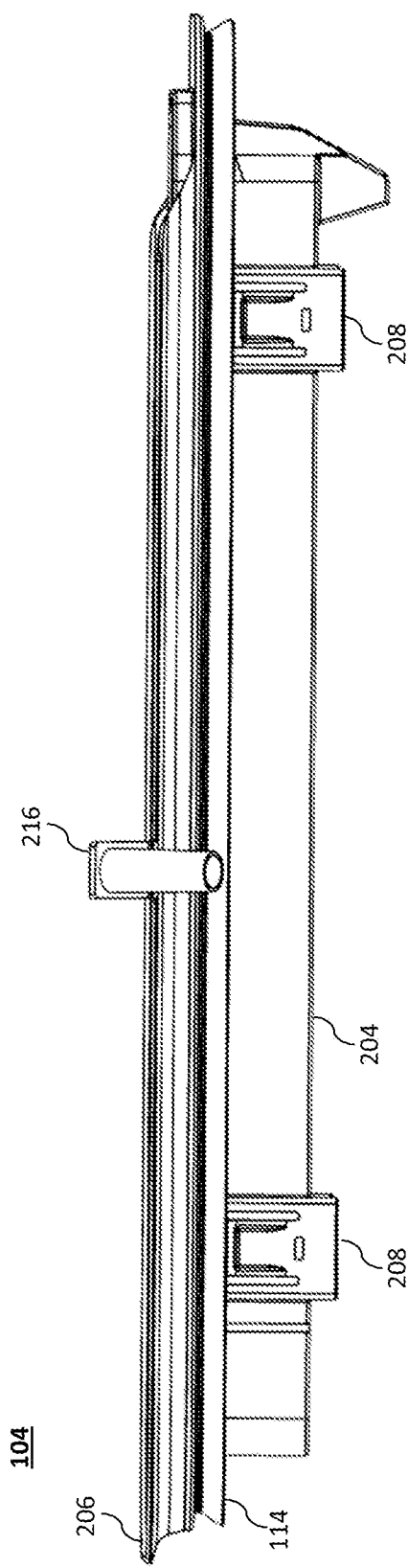
FIGS. 2c through 2f illustrate, respectively, first, second, third, and fourth side elevational views of the pressure vent valve.
Figure 2D:
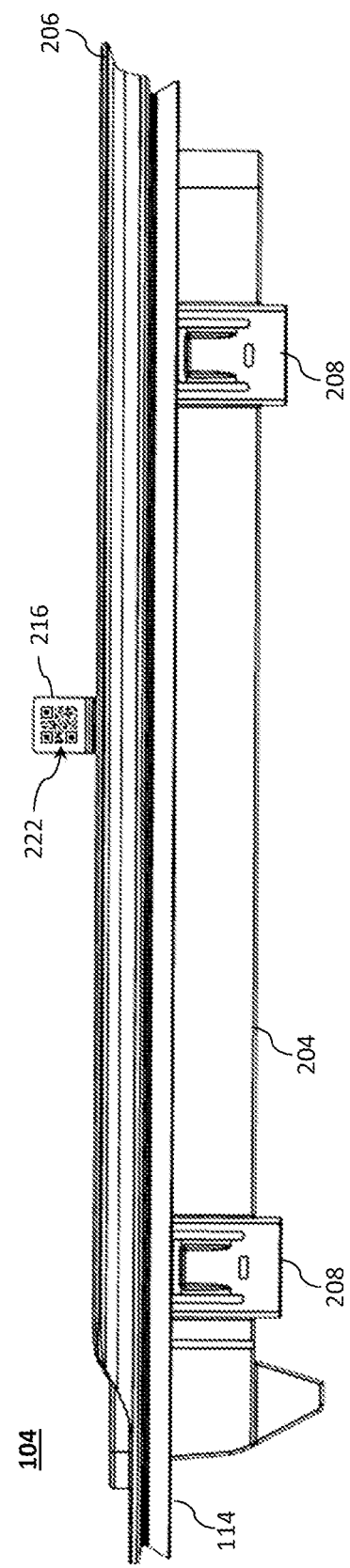

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," "upper," "lower," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

Disclosed is a return air blocking device with an installation indicator to enhance proper installation of the return air blocking device in a vehicle. In one example, a pressure vent valve for ventilation of an interior of a vehicle comprises: a frame defining a vent opening; a valve flap mounted on the frame and configured to transition between an idle position where airflow through the vent opening is blocked and an open position where airflow through the vent opening is not blocked; and an installation indicator formed in or on the frame.

In another example, a return valve installation system for a vehicle component, the return valve installation system comprises: a pressure vent valve having a frame and a valve flap configured to block a vent opening formed in the frame; an installation indicator coupled to the pressure vent valve; and a reader separate from the pressure vent valve and operatively coupled to a computer, the reader configured, via a processor, to track the installation indicator during installation of the pressure vent valve into an aperture of the vehicle component.

In some examples, the installation indicator comprises a lever extending from the frame. In some examples, the lever is coupled to the frame via a hinge. In some examples, the lever includes a 2-dimensional fiduciary marker or a 3-dimensional fiduciary marker. In some examples, the 2-dimensional fiduciary marker is a quick response (QR) code or an AprilTag. In some examples, the 3-dimensional fiduciary marker is integral with the lever. In some examples, the installation indicator further comprises a projection coupled to the lever. In some examples, the projection is configured to engage a surface of a vehicle component to rotate the lever about the hinge. In some examples, the frame further comprises at least one sealing surface and a plurality of fastening projections, wherein the at least one sealing surface and the plurality of fastening projections are positioned adjacent the vent opening. In some examples, the valve flap abuts the at least one sealing surface in the idle position to block the airflow and, when a pressure increases in the interior of a vehicle, the valve flap assumes the open position where the valve flap is lifted from the sealing surface to allow airflow through the vent opening. In some examples, the valve flap has a thickness between about 0.75 mm and 1.25 mm. In some examples, the frame is fabricated from a rigid material and the valve flap is fabricated from a flexible material. In some examples, the frame and the valve flap are a unitary structure.

FIGS. 1a and 1b illustrate, respectively, isometric views of an example return valve installation system 100 before and after assembly in accordance with an aspect of this disclosure. The illustrated return valve installation system 100 generally comprises a pressure vent valve 104 for installation in a vehicle component 102, a reader 106, and a computer 108. As will be discussed in connection with FIGS. 2a through 2g, the vehicle component 102 defines an aperture 110 configured to receive and retain the pressure vent valve 104 relative to a vehicle. During assembly, the pressure vent valve 104 is inserted into the aperture 110 in the vehicle component 102 body in the direction shown by an arrow 112.

The return valve installation system 100 is positioned between an interior of a vehicle and the exterior environment of the vehicle and used for ventilation of the interior. The vehicle component 102 maybe attached to, or integral with, the vehicle. The vehicle may be, for example, a motor vehicle. In operation, the pressure vent valve 104 is inserted in an aperture 110 provided therefor in the body of the vehicle. The pressure vent valve 104 is inserted such that the back of the pressure vent valve 104 faces the interior of the vehicle, and the front of the pressure vent valve 104 is allocated to a region outside the vehicle interior.

If a pressure vent valve 104 is installed incorrectly (e.g., the pressure vent valve 104 is not fully inserted into the aperture 110 within the vehicle component 102), the valve seal 114 will not compress sufficiently to perform the function of sealing. The valve seal 114 may be, for example, a thermoplastic vulcanisate (TPV) 2K seal that surrounds the periphery of the pressure vent valve 104. Should this occur, there is the potential to allow inward dust and water leakage from the exterior environment that could cause damage to the interior of the vehicle component 102.

To that end, the reader 106 can be positioned adjacent the pressure vent valve 104 and/or vehicle component 102 to monitor assembly of the pressure vent valve 104 with the vehicle component 102. The reader 106 is communicative coupled to the computer 108 via a wired or wireless link. The reader 106 is arranged to image or otherwise track an installation indicator 116 associated with the pressure vent valve 104. As will be discussed, the installation indicator 116 may be integral with the pressure vent valve 104. If the computer 108, via one or more processors 108a coupled to a memory device 108b, determines based at least in part on the installation indicator 116 that the pressure vent valve 104 is not properly mounted to the vehicle component 102, an alert may be communicated to the operator (e.g., via a portable communication device) and/or, if robotic assembly is employed, the robot may automatically repeat the assembly process to correct the error.

While a single installation indicator 116 is illustrated, multiple installation indicators 116 can be employed and associated with the pressure vent valve 104 during installation thereof. For example, a plurality of installation indicators 116 can be formed in or on the pressure vent valve 104 (e.g., along the perimeter) to provide redundancy and/or increase accuracy by having multiple positional data points.

FIGS. 2a and 2b illustrate, respectively, front perspective and rear perspective, views of the pressure vent valve 104. FIGS. 2c through 2f illustrate, respectively, first, second, third, and fourth side elevational views of the pressure vent valve 104. Finally, FIGS. 2g and 2h illustrate, respectively, top plan and bottom plan, views of the pressure vent valve 104.

The pressure vent valve 104 includes a frame 202 (or similar housing) that defines a generally rectangular form (though other shapes are contemplated). The frame 202 generally comprises a wall 204, a flange 206, and one or more attachments clips 208. In the illustrated example, the frame 202 defines, inter alia, at least one vent opening 210, at least one sealing surface 212, and a plurality of fastening projections 214. The one or more attachments clips 208 are configured to engage the aperture 110 and/or the vehicle component 102.

As noted above, the pressure vent valve 104 further comprises an installation indicator 116. In the illustrated example, the pressure vent valve 104 includes an installation indicator 116 in the form of a lever 216 extending from an edge of a flange 206 of the frame 202. The lever 216 is illustrated as a generally flat structure defining a first planar surface 216a and a second planar surface 216b. The lever 216 includes a hinge 218 that allows all or a portion of the lever 216 to be pivoted, bent, and/or otherwise moved relative to the frame 202.

The installation indicator 116 includes a fiduciary marker 222 (e.g., a barcode, quick response (QR) code, AprilTag, etc.) positioned on the first planar surface 216a of the lever 216 and a projection 220 extending outwardly from the second planar surface 216b at a generally orthogonal angle. The example projection 220 is illustrated as a slightly tapered protrusion (i.e., a conical frustum), however, as will be discussed, other shapes and sizes are contemplated. While the lever 216 is illustrated as a generally flat structure, it is conceivable that other shapes can be used to orient a fiduciary marker 222 (illustrated as position on the first planar surface 216a) at the proper angle relative to the reader 106 when the vehicle component 102 is properly inserted and seated into the aperture 110 of the vehicle component 102.

The lever 216, the hinge 218, projection 220, and/or fiduciary marker 222 may be integrally formed with the frame 202 during the molding process. For example, the hinge 218 may be formed as a thin region in the lever 216 to permit bending. In another example, the hinge 218 may be formed post-molding by scoring channels into one or both sides of the lever 216 to permit bending at such point.

An example fiduciary marker 222, in the form of a QR code, is best illustrated in Detail A of FIG. 2a. While a 2-dimensional fiduciary marker 222 is illustrated throughout the figures, 3-dimensional fiduciary markers can be employed. The fiduciary marker 222 may be attached to, printed on, or positioned in any other suitable manner on the lever 216. In a 2-dimensional application, the fiduciary marker 222 may be printed directly on the lever 216 using ink or applied as a sticker using adhesive. In other examples, the fiduciary marker 222 may be formed in or on the lever 216 during fabrication of the frame 202 and/or the lever 216. In addition to positioning, the fiduciary marker 222 may include information regarding, for example, the pressure vent valve 104. Such information could include, for example, a model number, serial number, manufacturing date, lot number, material type, etc.

In the case of a 3-dimensional fiduciary marker 222, the 3-dimensional fiduciary marker 222 can be fabricated with the lever 216 or separately and later adhered to the lever 216. The 3-dimensional fiduciary marker 222 may be, for example, a known arrangement of 3-dimensional elements or shapes, the orientation of which can be tracked by the combination of the reader 106 and the computer 108.

Figure 2E:
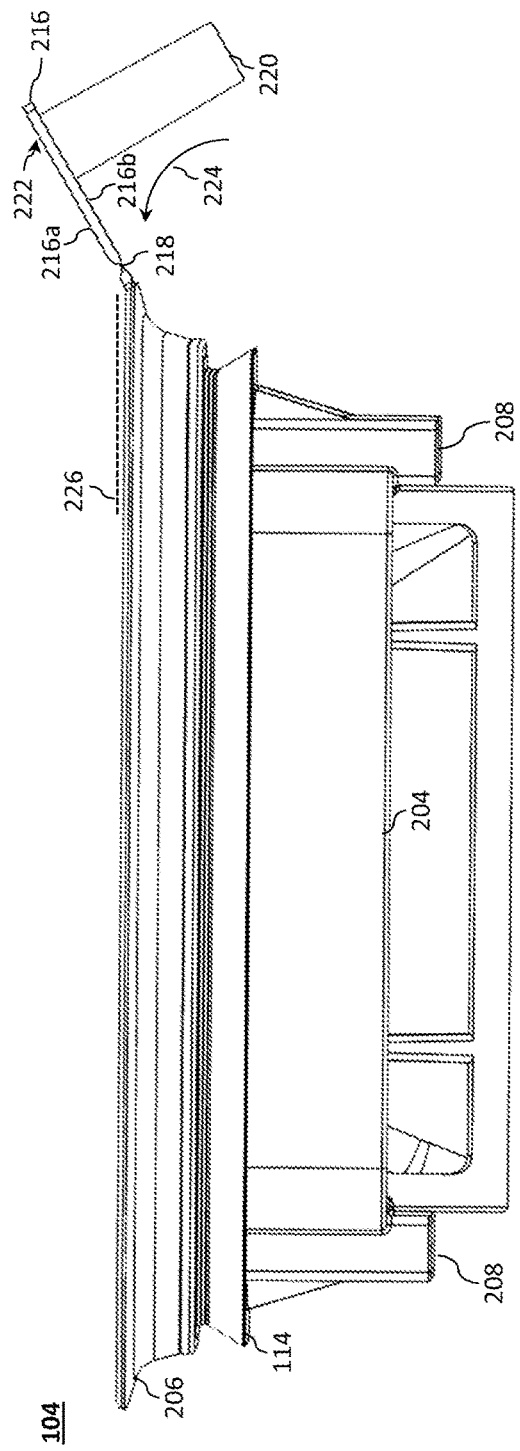
Figure 2F:
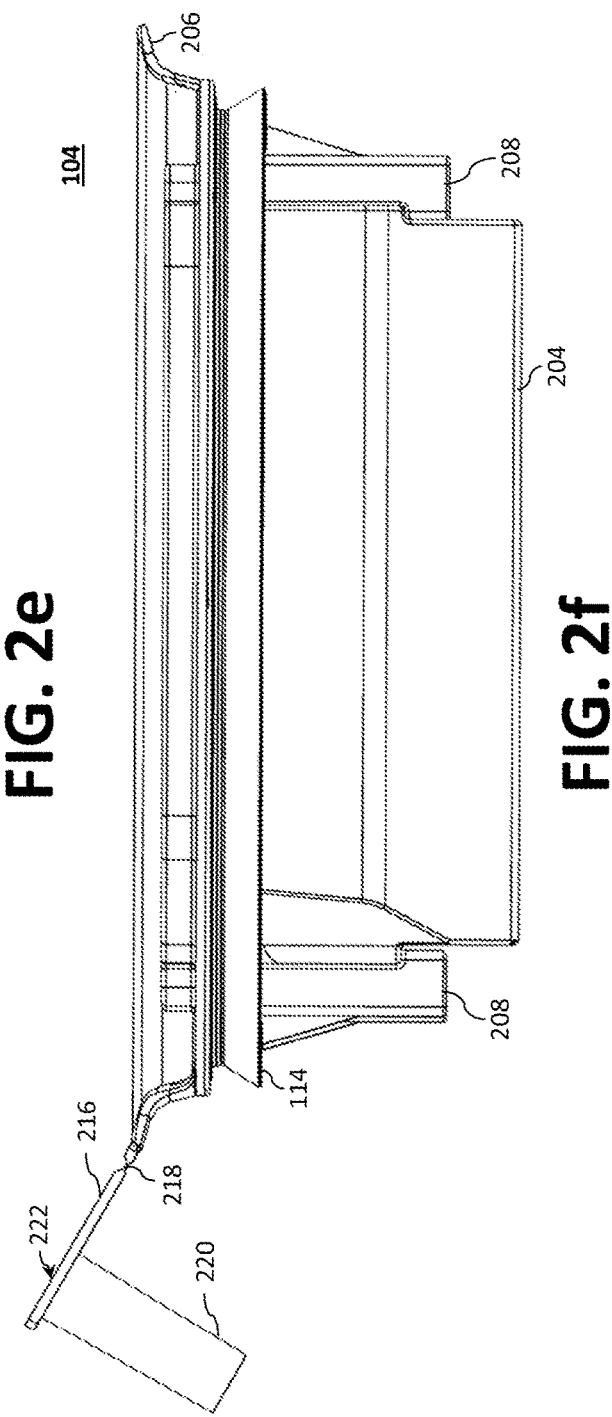
Figure 2H:
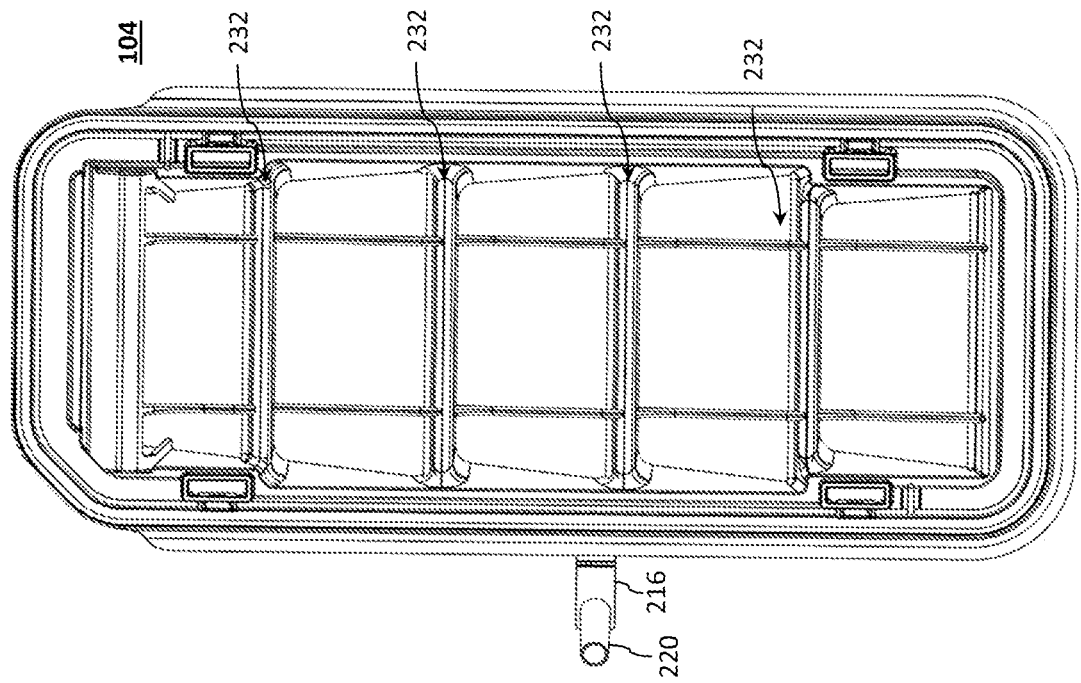
FIGS. 2g and 2h illustrate, respectively, top plan and bottom plan, views of the pressure vent valve.
Figure 2G:
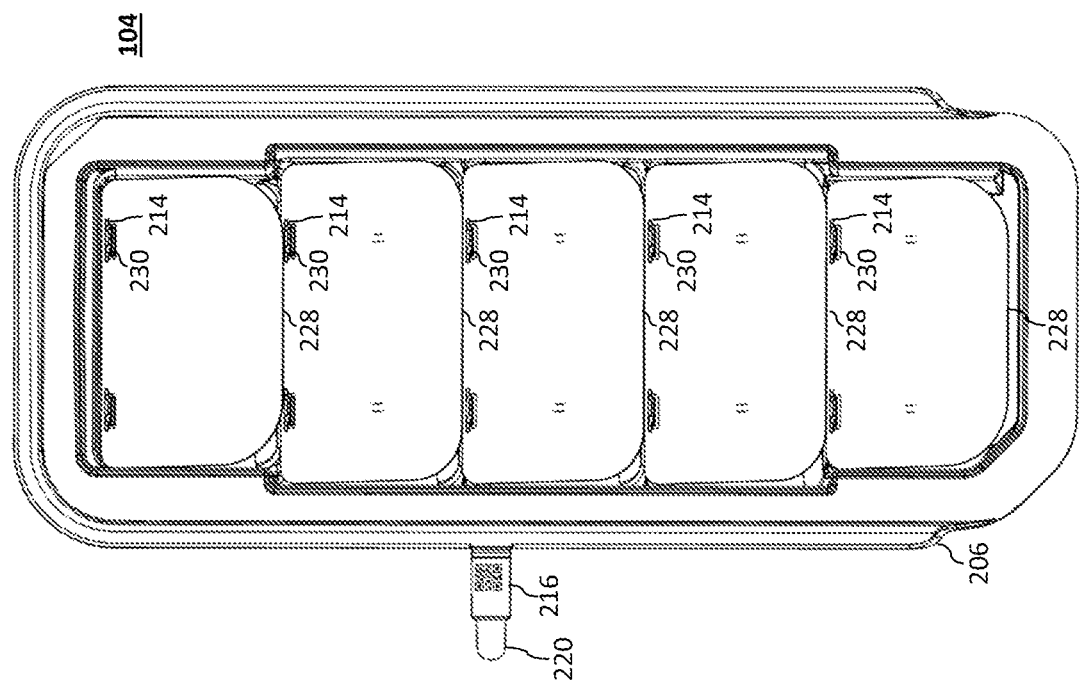

With reference to FIG. 2e, the pressure vent valve 104 is inserted into the aperture 110, the projection 220 on the lever 216 configured to engage a surface of the vehicle component 102 during installation to causes the lever 216 to rotate about the hinge 218 as indicated by arrow 224. In the illustrated example, the projection 220 is positioned about 90 degrees (i.e., an orthogonal angle) relative to second planar surface 216b of the lever 216. As noted previously, while the projection 220 is generally illustrated as having a conical frustum shape, the projection 220 may be otherwise sized and shaped depending on the desire application. For example, if the pressure vent valve 104 is installed in a vehicle component 102 adjacent a vertical surface (e.g., a wall), the projection 220 may be shortened or otherwise shaped to engaged the vertical surface such that the lever 216 is still bent to the desired angle upon installation.

A reader 106, such as a barcode reader or other reader, could be positioned at about 90 degrees to a plane 226 of the pressure vent valve 104 running through the flange 206 and/or parallel to the lever 216. Once the pressure vent valve 104 is fully and properly inserted, the fiduciary marker 222 will be at an angle of about 90 degrees (i.e., an orthogonal angle) with respect to the plane of the pressure vent valve 104 running through the flange 206 and at about 90 degrees with respect to the original position of the lever 216. For example, where the reader 106 is an optical reader with a lens, the lens would then be generally parallel to the plane defined by the first planar surface 216a upon which the fiduciary marker 222 is mounted (i.e., the lever 216). From this vantage point, the reader 106 would be able to read the fiduciary marker 222. In which case, the valve seal 114 around the pressure vent valve 104 would be sufficiently compressed to provide protection from dust and water. If the lever 216 with fiduciary marker 222 is at another angle, the fiduciary marker 222 would not be read and the computer 108 would issue an error notification.

Depending on the application, the frame 202 may be fabricated from a rigid material, such as, for example, synthetic or semi-synthetic polymers (e.g., plastics, such as acrylonitrile butadiene styrene (ABS) and polyvinyl chloride (PVC), etc.), composite materials (e.g., fiber glass), metal (or a metal alloy), or a combination thereof. In the illustrated example, the frame 202 can be fabricated using a relatively hard plastic via a plastic injection molding process. Therefore, in some examples, the frame 202 and its various features can be formed as a unitary structure. For example, the lever 216 and projection 220 may be formed integrally with the frame 202, for example, as part of an injection molding process. Optionally, the lever 216 and projection 220 may be formed separately and attached to the pressure vent valve 104. While the lever 216 is shown as being attached to the flange 206 of the pressure vent valve 104, the lever 216 may optionally be attached to any other suitable part of the pressure vent valve 104.

As best illustrated in FIG. 2h, the frame 202 can be divided by one or more webs 232 to define the one or more vent openings 210. In the illustrated example, the five vent openings 210 are arrange in a column or series arrangement. Other quantities and arrangements, however, are contemplated (e.g., in a quad, triangular, etc.). In particular, the illustrated frame 202 provides four webs 232 to define forms five vent openings 210. The vent openings 210 are illustrated as generally rectangular openings, though other shapes are contemplated (e.g., square, trapezoidal, etc.).

The frame 202 includes at least one sealing surface 212 and at least one flexible valve flap 228 mounted on the frame 202. Each of the plurality of valve flaps 228 is coupled to the frame 202 at or adjacent each of the plurality of vent openings 210. As illustrated, a valve flap 228 is arranged adjacent each of the five vent openings 210 and configured to cover each respective one of the five vent openings 210 when in the idle position. Each of the valve flaps 228 is configured to alternate between the idle position and an open position.

The frame 202 is formed with sealing surfaces 212 such that the valve flaps 228, when in the idle position, substantially and/or completely prevent airflow through the vent openings 210 of the frame 202. Therefore, the sealing surfaces 212 are generally located at the contact regions between the valve flap 228 and frame 202. The sealing surfaces 212 for the valve flaps 228 can be fabricated using a softer plastic material. For example, the sealing surfaces 212 can be molded onto the frame 202 in a multi-component injection molding process. In one example, the one or more sealing surfaces 212 are provided at the perimeter of each of the vent openings 210. The sealing surface 212 around each vent opening 210 may be continuous or segmented. Therefore, in some examples, the sealing surface 212 generally surrounds the vent openings 210 (or at least a bottom edge) and contacts the valve flap 228.

The valve flaps 228 are fabricated using a material that is flexible and/or softer relative to the material of the frame 202. In some examples, the flexible valve flap 228 is made of a flexible material, such as closed pore, foamed material. It is also conceivable that the valve flaps 228 could comprise other plastic and/or rubber flexible materials. In any case, the valve flaps 228 are generally thin and hence very flexible to allow them to alternate or otherwise transition between the idle position and the open position.

The valve flaps 228 are mounted at one end (e.g., along one edge) on the frame 202 via, inter alia, one or more fastening projections 214 formed on the frame 202. In the illustrated example, a plurality of fastening projections 214 are arranged and aligned in a row along an upper edge of each of the vent openings 210.

To prohibit the valve flap 228 from detaching, the plurality of fastening projections 214 can pass through the valve flap 228. To that end, the valve flaps 228 each have a plurality of flap openings 230 formed along an edge through which the fastening projections 214 of the frame 202 are passed to secure the valve flap 228 to the frame 202. The valve flaps 228 are mounted by passing the fastening projections 214 through the flap openings 230. The fastening projections 214 may be tapered and sized such that a tip of the fastening projection 214 is smaller than the flap opening 230, while a base end of the fastening projection 214 is larger than the flap openings 230. As a result, when installed, the flap opening 230 can stretch and/or deform to better contact and secure to the fastening projections 214 at the base end.

The various figures illustrate the valve flap 228 in the idle position (e.g., closed). In the idle position, the valve flap 228 abuts the sealing surface 212 and is configured to block airflow through the vent opening 210. When a pressure increases in the interior of a vehicle, the valve flap 228 assumes the open position such that the valve flap 228 is lifted from the sealing surface 212 to allow airflow through the vent opening 210.

When the air pressure increases within the cabin, for example, the valve flaps 228 assume a vent position whereby the flaps valve flaps 228 flex upward and away from the frame 202 to allow air flow through the vent opening 210 of the frame 202. In other words, when a sufficient pressure occurs, assumes an open position lifted from the sealing surface 212 in which it allows airflow through the pressure vent valve 104. Once the pressure between the vehicle interior and the environment has balanced, the valve flaps 228 close automatically under their own weight (i.e., they return to the idle position).

In some examples, the valve flap 228 has a thickness between about 0.75 mm and 1.25 mm, or about 1.0 mm. Thicker or thinner thicknesses for the valve flap 228 may be used; however, attention must be paid to the overall thickness and/or rigidity of the valve flap 228 to ensure that the valve flap 228 remains sufficiency flexible to deflect into the open position during operation.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A pressure vent valve for ventilation of an interior of a vehicle, wherein the pressure vent is installable in the interior of the vehicle in an aperture in a vehicle component, the pressure vent valve comprising:
   a frame defining a vent opening;
   a valve flap mounted on the frame and configured to transition between an idle position where airflow through the vent opening is blocked and an open position where airflow through the vent opening is not blocked; and
   an installation indicator formed in or on the frame, wherein the installation indicator comprises a fiduciary marker,
   wherein when the pressure vent is installed properly with the vehicle component, the installation indicator configured to be at a first angle, and
   wherein when the pressure vent is installed in error, the installation indicator is configured to be at a second, different angle than the first angle.

2. The pressure vent valve of claim 1, wherein the installation indicator comprises a lever extending from the frame that defines a planar surface for the fiduciary marker.

3. The pressure vent valve of claim 2, wherein the lever is coupled to the frame via a hinge and is configured to pivot from a first position to a second position during installation.

4. The pressure vent valve of claim 2, wherein the fiduciary marker is a 2-dimensional fiduciary marker.

5. The pressure vent valve of claim 4, wherein the 2-dimensional fiduciary marker is a quick response (QR) code.

6. The pressure vent valve of claim 2, wherein the fiduciary marker is a 3-dimensional fiduciary marker.

7. The pressure vent valve of claim 6, wherein the 3-dimensional fiduciary marker is integral with the lever.

8. The pressure vent valve of claim 2, wherein the fiduciary marker is positioned on a front surface of the lever and the installation indicator further comprises a projection extending from a rear surface of the lever.

9. The pressure vent valve of claim 3, wherein the projection is configured to engage a surface of a vehicle component to rotate the lever about the hinge during installation.

10. The pressure vent valve of claim 1, wherein the frame further comprises at least one sealing surface and a plurality of fastening projections, wherein the at least one sealing surface and the plurality of fastening projections are positioned adjacent the vent opening.

11. The pressure vent valve of claim 10, wherein the valve flap abuts the at least one sealing surface in the idle position to block the airflow and, when a pressure increases in the interior of a vehicle, the valve flap assumes the open position where the valve flap is lifted from the sealing surface to allow airflow through the vent opening.

12. The pressure vent valve of claim 1, wherein the valve flap has a thickness between about 0.75 mm and 1.25 mm.

13. The pressure vent valve of claim 1, wherein the frame is fabricated from a rigid material and the valve flap is fabricated from a flexible material.

14. The pressure vent valve of claim 1, wherein the frame and the valve flap are a unitary structure.

15. A return valve installation system for a vehicle component, the return valve installation system comprising:
- a pressure vent valve having a frame and a valve flap configured to block a vent opening formed in the frame wherein the pressure vent valve is configured to be installed in the interior of the vehicle in an aperture in the vehicle component;
- an installation indicator coupled to the pressure vent valve, wherein the installation indicator comprises a fiduciary marker; and
- a reader separate from the pressure vent valve and operatively coupled to a computer, the reader configured, via a processor, to track the installation indicator during installation of the pressure vent valve into an aperture of the vehicle component,
  - wherein when the pressure vent valve is installed properly with the vehicle component, the installation indicator configured to be at a first angle, and
  - wherein when the installation indicator is at a second, different angle than the first angle as the reader tracks the installation indicator, the reader is configured to issue an error notification.

16. The pressure vent valve of claim 15, wherein the installation indicator comprises a lever extending from the frame that defines a planar surface for the fiduciary marker.

17. The pressure vent valve of claim 16, wherein the lever is coupled to the frame via a hinge and configured to pivot between a first position to a second position during installation.

18. The pressure vent valve of claim 16, wherein the fiduciary marker is a 2-dimensional fiduciary marker.

19. The pressure vent valve of claim 17, wherein the fiduciary marker is positioned on a front surface of the lever and the installation indicator further comprises a projection extending from a rear surface of the lever that is configured to engage a surface of the vehicle component to rotate the lever about the hinge during installation.

20. A pressure vent valve for ventilation of an interior of a vehicle, the pressure vent valve comprising:
- a frame defining a vent opening;
- a valve flap mounted on the frame and configured to transition between an idle position where airflow through the vent opening is blocked and an open position where airflow through the vent opening is not blocked; and
- an installation indicator formed in or on the frame, wherein the installation indicator comprises a fiduciary marker,
  - wherein the installation indicator comprises a lever extending from the frame that defines a planar surface for the fiduciary marker, ands
  - wherein the fiduciary marker is positioned on a front surface of the lever and the installation indicator further comprises a projection extending from a rear surface of the lever.

* * * * *